March 24, 1970     R. H. BLANCHARD ET AL     3,502,106
MANIFOLD VALVE ASSEMBLY

Filed June 19, 1967     2 Sheets-Sheet 1

INVENTORS
ROGER H. BLANCHARD
RICHARD L. CISCO

BY
Oberlin, Maky, Donnelly & Renner
ATTORNEYS

March 24, 1970  R. H. BLANCHARD ET AL  3,502,106
MANIFOLD VALVE ASSEMBLY
Filed June 19, 1967  2 Sheets-Sheet 2

INVENTORS
ROGER H. BLANCHARD
RICHARD L. CISCO

BY
Oberlin, Maky, Donnelly & Renner
ATTORNEYS

United States Patent Office 3,502,106
Patented Mar. 24, 1970

1

3,502,106
MANIFOLD VALVE ASSEMBLY
Roger H. Blanchard, Palos Verdes Estates, and Richard L. Cisco, Torrance, Calif., assignors to Parker-Hannifin Corporation, Cleveland, Ohio, a corporation of Ohio
Filed June 19, 1967, Ser. No. 647,166
Int. Cl. B64d *37/14;* F16k *17/00*
U.S. Cl. 137—612.1
16 Claims

ABSTRACT OF THE DISCLOSURE

Manifold valve assembly for use as in aircraft fuel tank filling operations characterized by a unitary housing having a fuel inlet manifold communicating with a plurality of fuel outlet ports via valve assemblies operative independently or simultaneously. Manifold valve assemby further characterized in the provision of a de-fueling port communicating with the inlet manifold, whereby fuel in the tanks may be diverted to the de-fueling port for discharge through the port which is the inlet port for tank filling operations.

---

The present invention relates generally as indicated to a manifold valve assembly and, more particularly, to such manifold valve assembly for use in filling aircraft fuel tanks.

It is a principal object of this invention to provide a manifold valve assembly which is of unitary construction provided with a fuel inlet port leading into a manifold which is common to discharge ports that lead to the respective fuel tanks.

It is another object of this invention to provide a manifold valve assembly which has individual shutoff valves in the respective discharge ports which may be independently serviced or replaced, or which, in the case of an aircraft having fewer fuel tanks than discharge ports in the manifold valve assembly, may be replaced with a simple form of plug.

It is another object of this invention to provide a manifold valve assembly of the character indicated in which the unitary manifold valve assembly has, in addition to outlet ports leading to the respective fuel tanks, a de-fueling port which communicates with the manifold so that when the outlet valves are closed, the tanks may be de-fueled by conducting the fuel into the de-fueling port and out through the fuel inlet port.

It is another object of this invention to provide, in addition to automatic controls for the respective outlet valves responsive as, for example, to predetermined filling of the respective tanks, override means to open or close said outlet valves independently of said automatic controls.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

2

Figure 1:
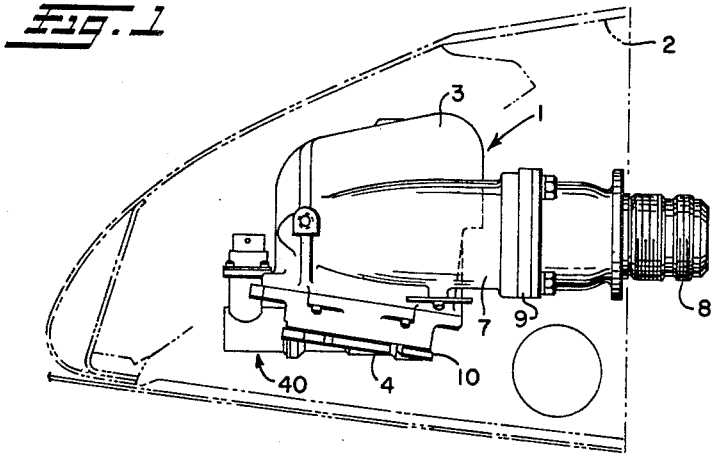
FIG. 1 is an elevation view of a manifold valve assembly embodying the present invention.
Figure 2:
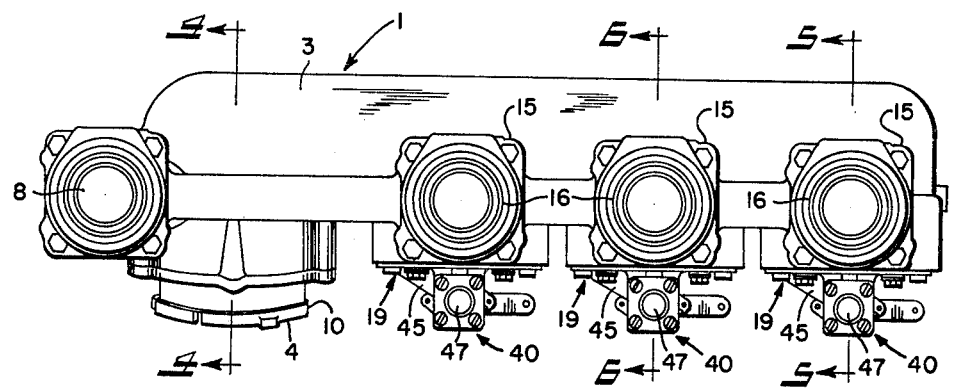
FIG. 2 is a front elevation view as viewed from the right-hand side of FIG. 1.
Figure 3:
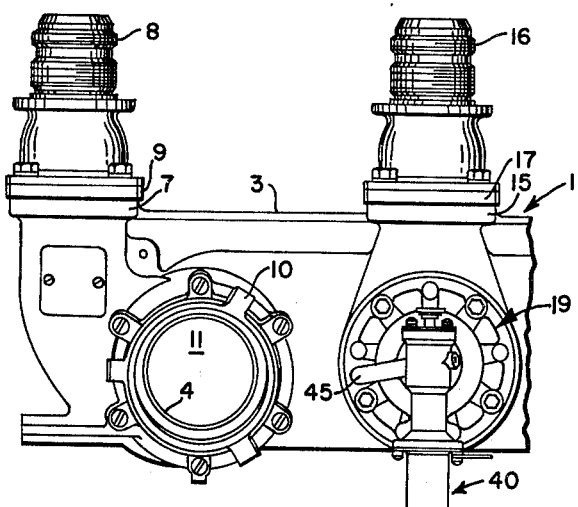
FIG. 3 is a bottom plan view partly broken away to show but one of the three discharge ports.
Figure 4:
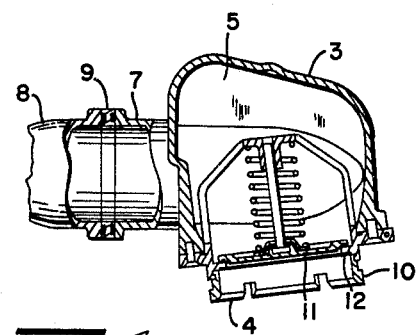
Figure 6:
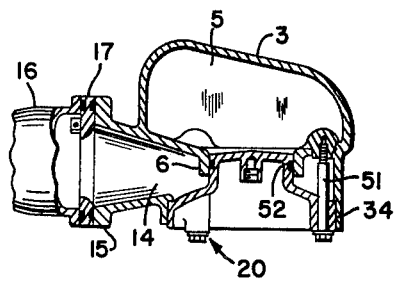
Figure 5:
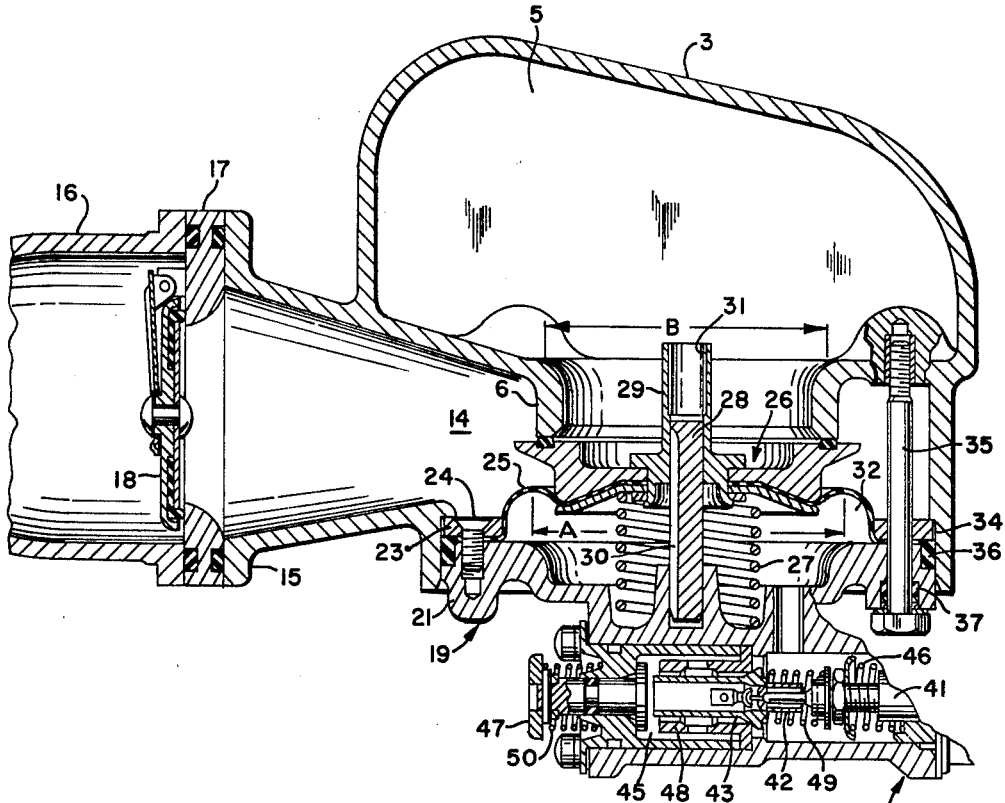

FIG. 4 is a cross-section view through the inlet port as viewed along the line 4—4, FIG. 2;

FIG. 5 is an enlarged cross-section view through one of the discharge ports as viewed along the line 5—5, FIG. 2; and FIG. 6 is a cross-section view as viewed along the line 6—6, FIG. 2 illustrating a modification wherein the manifold valve assembly has an unused discharge port.

Referring now more particularly to the drawings, the manifold valve assembly 1 is herein shown as being mounted in an aircraft wing section 2 and comprises a unitary hollow housing 3 having a fuel inlet port 4 communicating with an elongated fuel chamber 5 which at several points along its length (herein three such points) is provided with tubular projections 6 which constitute outlet valve seats, as best shown in FIG. 5. The fuel chamber 5 also communicates with a de-fueling port 7 to which the port adaptor 8 is bolted as shown, the joint being sealed by the packing ring assembly 9.

The fuel inlet port 4 is provided with a connector 10 of known form to which a fueling nozzle, not shown, is adapted to be detachably secured to urge the spring-seated inlet valve 11 out of engagement with its seat 12 for flow of fuel into the manifold chamber 5.

Each tubular projection 6 aforesaid (see FIG. 5) extends into an outlet chamber 14 which terminates in an outlet port 15 to which the port adapter 16 is bolted as shown, the joint being sealed by the packing ring assembly 17. In this case, the ring 17 constitutes a seat for a swing check valve 18. As evident, the check valves 18 in the respective outlet ports 15 will prevent reverse flow of fuel in the event that more than one fuel flow control valve 19 is open. The check valves 18 also prevent fuel from flowing from the respective tanks (not shown) in the event of removal of the respective fuel control valve 19.

Each fuel flow control valve 19 (see FIG. 5) herein shown for purposes of illustration, comprises a circular housing 21 to one side of which is clamped by means of the ring 23 and screws 24, the peripheral portion of a flexible diaphragm 25. The central portion of the diaphragm 25 has secured thereto a valve plate assembly 26 which is biased by the spring 27 into engagement with the end of the tubular projection 6. A valve guide rod 28 is fixed in the housing 21 and slidably engages the tubular bushing 29 of the assembly 26. The valve guide rod 28 has a longitudinally extending groove 30, and when the valve plate assembly 26 is shifted downwardly, the upper end of the rod 28 defines with the counterbore 31 of the guide bushing 29 an annular orifice which communicates with the aforesaid groove 30 for flow of fuel from the manifold chamber 5 into the chamber 32 behind the diaphragm 25.

Each control valve 19 is seated in a counterbore 34 in the housing 3 as by screws 35, suitable packing rings 36 and 37 being provided to seal the valve assembly 19 in the counterbore 34 and to seal the shanks of the screws 35.

As evident, when the pressure in the chamber 32 acting on area of diameter A is less than the pressure in the manifold chamber 5 acting on area B of the seat 6, the valve assembly 26 will be urged downwardly for flow of fuel through the outlet chamber 14 and port 15 with consequent opening of the swing check valve assembly 18 and flow of fuel into the tank to which the port adapter 16 is connected.

It is to be understood that the pressure in the chamber 32 may be controlled by a level control valve such as, for example, those disclosed in the patents to Russell 2,913,217 and Klamm et al. 2,938,550 wherein the pressure in the seating chamber 32 is less than in the manifold chamber 5 as long as the fuel level in the tank is below a predetermined level. When the desired level is reached, the pressure in the seating chamber 32 buids up sufficiently so that its effect on the larger area A plus the bias of the spring 27, will overcome the unseating influence of the fuel pressure in the manifold chamber 5 acting on the area B of the seat 6.

In the present case, the pressure in the seating chamber 32 is decreased to the pressure in the outlet chamber 14 by energizing the solenoid valve 40 and when the armature 41 thereof is pulled to the right as viewed in FIG. 5, the valve member 42 is pulled away from its seat on tubular valve member 43 thus to bleed the fuel out of the seating chamber 32 through the tubular valve member 43 faster than it can be replenished through the orifice between the rod 28 and guide 29, the fuel from the seating chamber 32 flowing through the open valve and the passage 45 into the outlet chamber 14. As known in the art, when the tank is filled to desired level, a float switch, a capacitance gaging system, or any comparable level responsive signal, will de-energize the solenoid valve 40 whereby the spring 46 will urge the armature 41 to the left as view in FIG. 5, to cause the valve member 42 to engage the seat of valve member 43 and block the flow therethrough. Thus, the pressure in the seating chamber 32 will build up to a value equal to that in the manifold chamber 5, whereupon such pressure acting on the differential area A–B with the assistance of the spring 27, will force the valve plate assembly 26 into engagement with the seat 6 to discontinue the tank filling operation. Also, at this time the check valve 18 will engage its seat 17.

In the event that it is desired to discontinue the tank filling operation prior to the level sensing signal aforesaid, each housing 21 is provided with a manual push button 47 which will engage the open end of the valve member 43 to stop the fuel flow therethrough and thus effect closing of the associated outlet valve 19. When the solenoid valve 40 is in de-energized condition, further pushing in of the button 47 will force the valve member 43 out of engagement with its seat 48 to bleed the seating chamber pressure therethrough and around the valve member 43 to the outlet chamber 14, such movement of the valve member 43 together with the valve member 42 and armature 41 compressing the spring 46 on the armature 41. A spring 49 between the armature 41 and valve member 43 holds the latter engaged with its seat member 48 when the solenoid valve 40 is energized. When the push button 47 is released, the spring 50 biases it to the inactive position shown in FIG. 5.

Another feature of the present invention is that the manifold valve assembly 1 may readily be adapted for use in aircraft having fewer number of fuel tanks than outlet ports 15. For instance, if the aircraft has only two fuel tanks, whereas the manifold valve assembly is provided with three outlet ports 15, the unused outlet port 15 may be plugged as shown in FIG. 6, the plug 20 being fashioned to be seated within the unused counterbore 34 by the bolts 51 in the same way as the valve housing 21 is seated in the counterbore 34. The plug 20 is provided with a packing ring 52 which seals in the bore of the seat projection 6. Furthermore, in connection with an unused outlet port 15, as shown in FIG. 6, the ring 17 need not be equipped with the swing check valve assembly 18.

With further reference to FIG. 5, it is to be understood that the solenoid valve 40 may be de-energized by a switch (not shown) in series with the aforesaid float operated switch thus to constitute an electrical override in the event that it is desired to discontinue the tank-filling operation before the tank is filled to the level determined by the float operated switch. Thus, the present invention provides not only a manual override as described in connection with the pushbutton 47 operation, but also a manually operated electrical override.

The manifold valve assembly 1 herein shown for purpose of illustration is of the normally-closed, fail-open type and it is to be understood that the fuel control valves 19 may be variously modified to make them normally-open instead of normally-closed as herein shown, fail-closed instead of fail-open as herein shown. Furthermore, the solenoid valves 40 may be arranged to be energized to close the respective valves 19 instead of energized to open the respective valves 19 as herein shown. Moreover, the valves 19 may be arranged for manual opening or manual closing, or for operation by remote solenoid valves, float pilot valves, or the like.

Although reference has been made to use of the present manifold valve assembly 1 in the servicing of aircraft fuel tanks, it may be used in trucks, tank farms, refineries, or other liquid management situations.

Other modes of applying the principle of the invention may be employed, change being made as regards the details described, provided the features stated in any of the following claims, or the equivalent of such, be employed.

We therefore particularly point out and distinctly claim as our invention:

1. A valve assembly comprising a housing having a manifold chamber therein, an inlet passage for flow of fluid into said chamber and a plurality of outlet passages for flow of fluid from said chamber; outlet valves in said outlet passages selectively operable to open and close the respective outlet passages; and check valves in said outlet passages downstream of the respective outlet valves preventing reverse flow of fluid into said chamber as when more than one outlet passage is opened by the associated outlet valves.

2. The valve assembly of claim 1 wherein said housing has another passage through which fluid is adapted to be conducted to the inlet passage via said chamber.

3. The valve assembly of claim 1 wherein each outlet valve comprises movable outlet valve means having one side exposed to fluid pressure in said chamber and an opposite side of greater area exposed to fluid under pressure in said chamber whereby said outlet valve means is urged to a position closing the respective outlet passage; and wherein pilot valve means associated with each outlet valve is operative to decrease the fluid pressure thus acting on said opposite side of said outlet valve means whereby the fluid pressure in said chamber acting on said one side of said outlet valve means actuates the latter to a position opening its outlet passage for flow of fluid therethrough and through the associated check valve.

4. The valve assembly of claim 3 wherein said pilot valve means comprises a solenoid operated valve means which, when energized, conducts fluid under pressure acting on said opposite side of said outlet valve means to said outlet passages downstream of said outlet valve, and when de-energized, interrupts the flow of fluid therethrough to permit buildup of fluid pressure acting on said opposite side of said outlet valve means, and a manually actuated means operative to interrupt the flow of fluid through the energized solenoid operated valve means thus to permit buildup of fluid pressure acting on said opposite side of said outlet valve means.

5. The assembly of claim 1 further comprising means for connecting said inlet passage with a fuel supply nozzle, and means for connecting said outlet passages with a corresponding number of fuel takns; said housing having another outlet passage, said another outlet passage having a plug therein to close the same as when there are fewer tanks to be filled than there are outlet passages.

6. The valve assembly of claim 5 wherein the portion of said another outlet passage, downstream of said plug, is unobstructed.

7. A valve assembly comprising a unitary housing having an elongated manifold chamber therein, an inlet passage for flow of fluid into said chamber, and a plurality of outlet passages for flow of fluid from spaced apart locations along the length of said chamber; outlet valve means detachably secured in said outlet passages and selectively operable to open and close the respective outlet passages; and check valves in said outlet passages downstream of the respective outlet valve means preventing reverse flow of fluid as when any or all of said outlet valve means are removed for replacement or for servicing.

8. A valve assembly comprising a unitary housing having an elongated manifold chamber therein, an inlet passage for flow of fluid into said chamber, and a plurality of outlet passages for flow of fluid from spaced apart locations along the length of said chamber; outlet valve means detachably secured in said outlet passages and selectively operable to open and close the respective outlet passages; and check valves in said outlet passages downstream of the respective outlet valve means preventing reverse flow of fluid into said chamber as when more than one outlet passage is opened by the associated outlet valve means.

9. The valve assembly of claim 8 wherein said outlet passages have annular seats for the respective outlet valve means; and wherein said housing has counterbores coaxial with said seats in which the respective outlet valve means are detachably secured.

10. The valve assembly of claim 8 wherein each outlet valve comprises a valve means housing detachably secured to said unitary housing; a movable valve member having one side exposed to fluid pressure in said manifold chamber and an opposite side of greater area in restricted communication with said manifold chamber whereby said valve member is urged to a position closing the respective outlet passage when equal fluid pressures act on said one side and opposite side of said valve member; and pilot valve means in said valve housing operative to bleed fluid acting on said opposite side to said outlet passage downstream of said valve member more rapidly than it can be replenished through such restricted communication whereby said valve member is urged to a position opening the respective outlet passage by the then dominant fluid pressure in said manifold chamber acting on said one side of said valve member.

11. The valve assembly of claim 10 wherein said pilot valve means comprises a tubular member having a seat thereon, a solenoid operated valve means which, when energized, moves out of engagement with said seat to permit flow of fluid under pressure acting on said opposite side of said outlet valve member to said outlet passage downstream of said outlet valve means through said tubular member, and when de-energized, engages said seat to interrupt the flow of fluid through said tubular member to permit buildup of fluid pressure acting on said opposite side of said outlet valve member, and manually operated means movable into engagement with the open end of said tubular member to interrupt the flow of fluid therethrough when the solenoid operated valve means is out of engagement with said seat thus to permit buildup of fluid pressure acting on said opposite side of said outlet valve member.

12. The valve assembly of claim 11 further comprising a second seat for said tubular member, and spring means for biasing said tubular member into engagement with said second seat, continued movement of said manually operated means toward said tubular member being operative to unseat said tubular member to permit such flow of fluid under pressure acting on said opposite side of said outlet valve member to said outlet passage downstream of said outlet valve means through said second seat and around said tubular member.

13. A valve assembly comprising a housing having an elongated manifold chamber, and an inlet passage and a plurality of outlet passages opening into said manifold chamber; and individual outlet valves comprising valve housings detachably secured to said housing, valve members in said valve housings movable to selectively close and open fluid communication between said manifold chamber and said outlet passages, and check valves in said outlet passages downstream of the respective outlet valves preventing reverse flow of fluid into said chamber as when more than one outlet passage is opened by the associated outlet valves.

14. The valve assembly of claim 13 wherein said valve housings are seated in counterbores in said housing that are coaxial with the outlet passages opening into said manifold chamber.

15. The valve assembly of claim 13 wherein said valve housings have solenoid operated pilot valve means therein to control opening and closing movements of the respective valve members.

16. The valve assembly of claim 13 wherein said outlet passages terminate in outlet ports to which outlet port adaptors are secured; and wherein ring-like check valve seat members are clamped between the respective adaptors and outlet ports, said seat members carrying said check valve members which prevent reverse flow of fluid from said adaptors to the outlet passages.

References Cited

UNITED STATES PATENTS

| | | | |
|---|---|---|---|
| 2,644,484 | 7/1953 | Mansen | 137—608 XR |
| 2,918,934 | 12/1959 | Wheatley | 137—527.2 |
| 2,940,474 | 6/1960 | Webster | 137—612.1 |
| 3,039,489 | 6/1962 | Botkin | 137—608 |
| 3,158,164 | 11/1964 | Barton | 137—608 XR |
| 3,319,645 | 5/1967 | Mahoney et al. | 137—608 XR |
| 3,367,621 | 2/1968 | Griswold | 251—46 XR |
| 3,368,576 | 2/1968 | Crissey | 137—608 XR |
| 3,372,899 | 3/1968 | McPherson | 251—46 XR |

SAMUEL SCOTT, Primary Examiner